United States Patent [19]

Lipton et al.

[11] Patent Number: 5,572,250
[45] Date of Patent: Nov. 5, 1996

[54] UNIVERSAL ELECTRONIC STEREOSCOPIC DISPLAY

[75] Inventors: Lenny Lipton, San Rafael; Jeffrey J. Halnon, Richmond; Lawrence D. Meyer, San Rafael, all of Calif.

[73] Assignee: StereoGraphics Corporation, San Rafael, Calif.

[21] Appl. No.: 326,270

[22] Filed: Oct. 20, 1994

[51] Int. Cl.⁶ .................................................. H04N 13/00
[52] U.S. Cl. .............................. 348/43; 348/55; 348/473; 348/587
[58] Field of Search .................... 348/43, 55–57, 348/473, 476, 478, 587; H04N 13/00

[56] References Cited

U.S. PATENT DOCUMENTS

| | | | |
|---|---|---|---|
| 3,649,749 | 3/1972 | Gibson | 348/478 |
| 3,947,870 | 3/1976 | Yumde | 348/478 |
| 4,145,713 | 3/1979 | White | 348/55 |
| 4,319,266 | 3/1982 | Bannister | 348/587 |
| 4,523,226 | 6/1985 | Lipton | 348/49 |
| 4,620,227 | 10/1986 | Levin | 348/476 |
| 4,884,876 | 12/1989 | Lipton | 348/56 |
| 4,967,268 | 10/1990 | Lipton | 348/56 |
| 5,001,555 | 3/1991 | Park | 348/43 |
| 5,117,302 | 5/1992 | Lipton | 348/58 |
| 5,181,133 | 1/1993 | Lipton | 348/53 |

OTHER PUBLICATIONS

Advertising brochure and description for "Leeds Liquid Crystal 3–D Viewer," Millennium Professional and Technical Services, Limited, date unknown.
"Getting the Right Image on the Screen," Electronics Weekly, Apr. 10, 1985, p. 21.

*Primary Examiner*—Howard W. Britton
*Attorney, Agent, or Firm*—Limbach & Limbach, L.L.P.

[57] ABSTRACT

A stereoscopic display system unambiguously tags the perspective view for left and right video fields by encoding at least one of the video fields with a unique code, then detecting the code in order to drive shuttered eyewear in synchrony therewith.

21 Claims, 15 Drawing Sheets

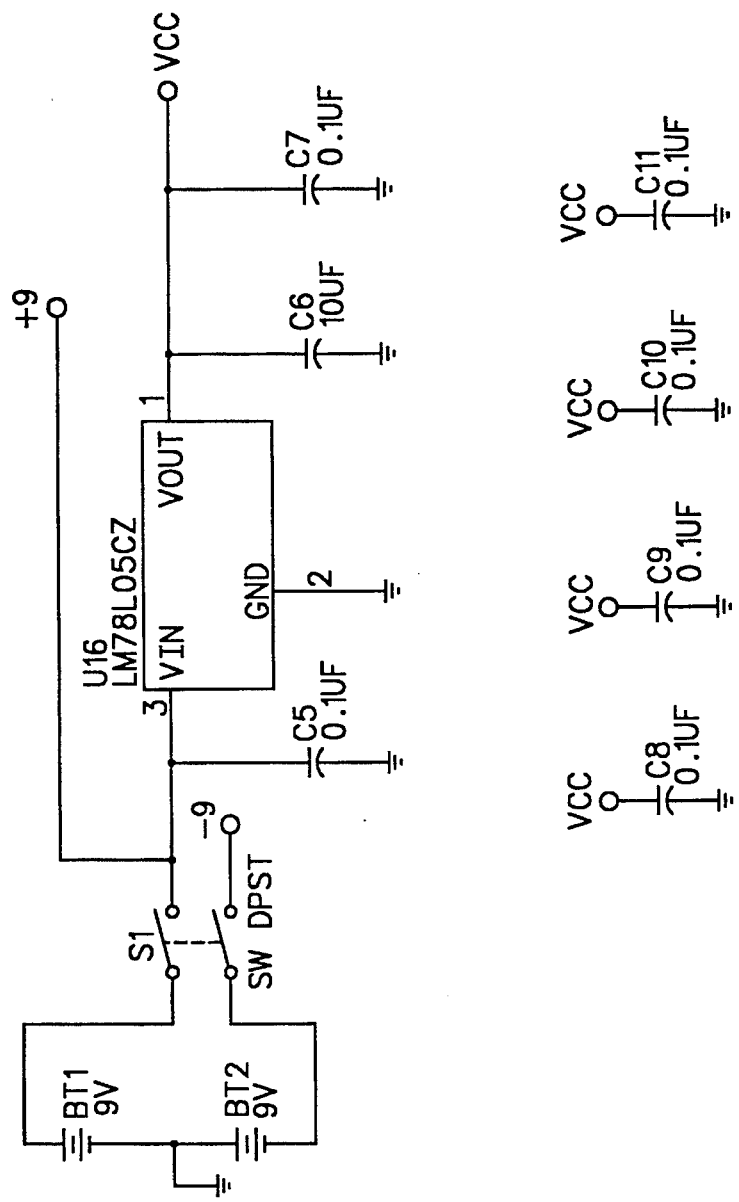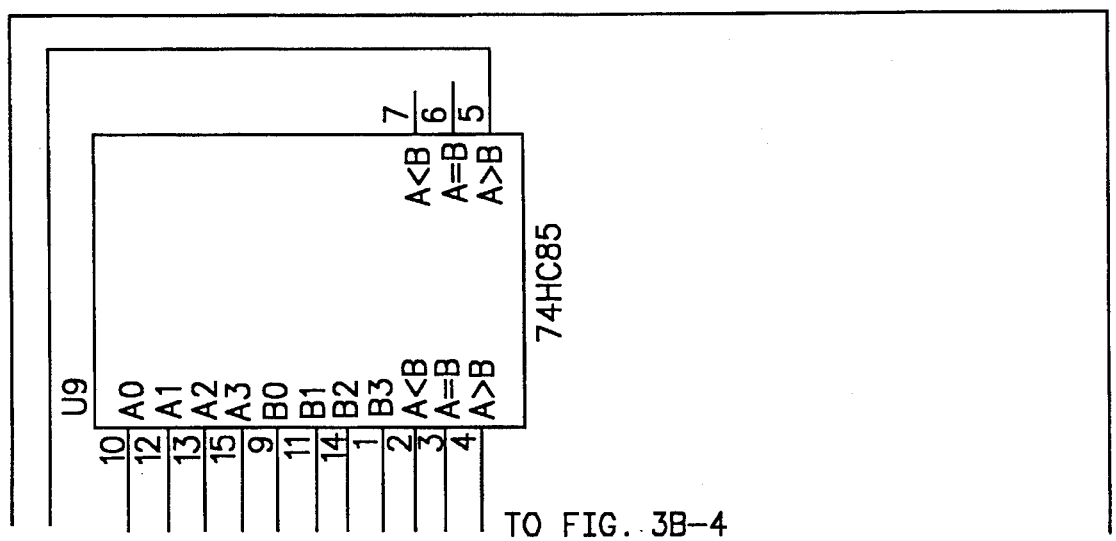
FIG. 3B-6

16,572,250

UNIVERSAL ELECTRONIC STEREOSCOPIC DISPLAY

FIELD OF THE INVENTION

The present invention relates to stereoscopic displays, and more particularly, to a method and apparatus for unambiguously identifying stereo pairs of video fields with the appropriate perspective view for the left and right eyes.

BACKGROUND

The introduction of CrystalEyes® eyewear in 1988 by StereoGraphics Corporation heralded the dawn of electronic stereoscopy as a viable medium for scientific visualization and other applications, as described in U.S. Pat. Nos. 4,884,876, 4,967,268, 5,117,302, and 5,181,133 to Lipton et al.

CrystalEyes® eyewear incorporates a shutter mounted in front of each eye, and these shutters, opening and closing in synchrony with the video field rate, alternately occlude and transmit left and right video fields. The shutters operate out of phase with each other, thereby transmitting the appropriate perspective view to one eye and blocking the inappropriate view from the other eye. If the fields are presented at a sufficiently high rate, the resultant stereoscopic image is perceived to be without flicker or flickerfree.

CrystalEyes® eyewear is often used in computer graphics applications with the above-and-below or subfield format described in U.S. Pat. No. 4,523,226. This format allows for the creation of stereopairs and doubles the field rate of the computer display. For example, if the computer runs at 60 fields per second, then using the above-and-below format, the total number of fields presented is increased to 120 per second. Thus, 60 fields per second are available for each eye and the result is perception of a flickerfree stereoscopic image.

According to the above-and-below approach, illustrated in FIG. 1, two subfields 101 and 103 are anamorphically squeezed in the vertical direction by a factor of two and are separated by a subfield vertical blanking interval 102. Subfield blanking interval 102 must have a vertical sync pulse (not shown) added to it which serves to index subfield 103 for the benefit of the display monitor.

In addition, this technique of tagging or indexing the subfield vertical blanking interval 102 lets the shuttering eyewear know which field has which perspective view. The adopted standard requires the left image to always be associated with the top subfield 101, which is immediately adjacent to the normal blanking area and sync pulse (not shown). Hence it is possible to unambiguously tag the left and right perspective views to the top subfield 101 and the bottom subfield 103, respectively. In the subfield approach, it does not matter whether scanning takes place in an interlace mode or in a progressive scan mode. The system is able to accommodate either approach.

Formatting images in this way has become widespread and is now used in many graphics computers, such as those manufactured by Silicon Graphics, Evans & Sutherland, Hewlett-Packard and others. By using the subfield approach, the manufacturer creates a format which is relatively inexpensive to implement because it has the same bandwidth as a planar format having half the number of fields. This system is dependent on having workstation monitors capable of running at approximately 120 fields per second, and there are now dozens of such monitors from which to choose. However, monitors are now a simple commodity, and there are literally hundreds of models of monitors. For the personal computer (PC) marketplace, as distinguished from the workstation marketplace, the ubiquitous multi-scan monitors typically run up to 90 fields per second, and no higher.

In the late 1970's and early 1980's, systems which ran at a total of 60 fields per second (or 30 fields per eye) were offered by Megatek for computer graphics applications and by Honeywell for video systems. A significant problem with this approach is that the user perceives tiresome flicker. Another problem is that the fields are not unambiguously tagged. Therefore, half of the time the image may be pseudostereoscopic instead of stereoscopic since the phase relationship of the shutters to the fields cannot be guaranteed. A pseudoscopic image is one in which the right eye sees the left fields, and vice versa. In such a case, the user must operate a control to put the shutters in phase with the fields so that a stereoscopic image rather than a pseudoscopic image is seen.

The pseudostereoscopic condition may be difficult to recognize because it is not seen in the real world. It will cause confusion because of conflicting stereoscopic and extrastereoscopic cues. It is an unpleasant effect which destroys the intention of the display to provide depth cues through binocular stereopsis.

Even though electronic stereoscopic displays of the flickerfree variety have a significant presence in the marketplace, there are still low-end display systems which provide only 30 fields per second per eye. These systems suffer both from flicker and from the ambiguous relationship of field to perspective view. As previously explained, this ambiguity does not exist with regard to the subfield or above-and-below technique.

The benefit of stereoscopic visualization, which has enhanced scientific and engineering applications for years, should also be enjoyed by users of low cost PC's. Thus, there is a need for a stereoscopic display to work in conjunction with commonly available PC graphics boards and generally available multi-scan monitors used in the PC marketplace. Such a system should have reduced flicker, and this can be achieved with almost any combination of personal computer, graphics board and multi-scan monitor. Such a system should function in both interlace and non-interlace modes, and it must have an unambiguous tag associated with one or both perspective views to insure the stereoscopic condition exists and preclude the pseudostereoscopic condition. Finally, it must be low cost because the PC marketplace is particularly price sensitive. Such a system is the subject of the present invention, and will be described below.

SUMMARY OF THE INVENTION

The present invention provides a method and a corresponding apparatus for unambiguously tagging a video field in a stereoscopic display system to indicate which perspective view, i.e., left or right, is presented by the field. In such a system, a video source generates left and right video fields which are then displayed on a monitor and viewed using shuttered eyewear. At least one of the fields is encoded with a unique code, which is then sensed periodically to verify the perspective.

In the preferred embodiment, the left video fields are encoded with a unique left code and the right video fields are encoded with a unique right code, each code being a predetermined pattern of video signals. An interface is provided between the video source and the display to monitor the video signals and sense the unique codes. Upon sensing a left code, the interface generate a logic signal which is used to drive the left shutter of the eyewear. Upon sensing a right code, the interface generate a logic signal which is used to drive the right shutter of the eyewear.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE ILLUSTRATIONS

FIG. 2b is a circuit diagram of the adapter of FIG. 2a.

FIG. 3b is a circuit diagram of the controller shown in FIG. 3a.

DETAILED DESCRIPTION OF THE INVENTION

Figure 1:
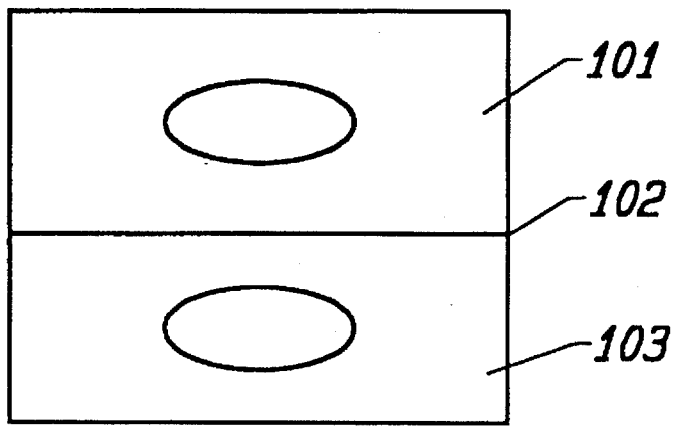
FIG. 1 is a drawing of a prior-art subfield system.

The primary object of the present invention is to provide a low-cost, flicker-reduced electronic stereoscopic display. This is possible to do, in part, because of the proliferation of multi-scan monitors capable of running at up to 90 fields per second, and in part, because of the proliferation of VGA-type graphics boards which may be adjusted to run at field rates between 60 and 90 fields per second.

In the case of a monitor and board combination allowing 90 fields per second, each eye is able to see 45 fields per second. At 45 fields per second, the perception of flicker is greatly reduced compared to 30 fields per eye per second.

It is well known that the perception of flicker varies with a number of parameters. In this case, the rate of occlusion of the shutters is of great importance. Additional factors include the brightness of the image and whether or not the subject is looking directly at the image or using peripheral vision. Further, the perception of flicker is idiosyncratic and varies from individual to individual. There is a steady progression of reduced perception of flicker as the field rate is advanced above 60 fields per second. We have found that most individuals perceive a field rate of approximately 90 fields per second (or 45 per eye per second) to be relatively unobtrusive.

Images that have large and bright textureless fields tend to flicker more than images that are dark and have detail and texture. The perception of flicker is reduced considerably in a darkened room. In a worst case, if the monitor is placed near a window on a bright day, while the displayed image has low flicker, the user may perceive substantial flicker from the area of the window. As mentioned above, flicker perception is greatest at the periphery of the visual field.

One technique which reduces flicker is the use of neutral-density filters in the optical path. The shutters used in CrystalEyes® eyewear, for example, transmit approximately 30% of the light. If neutral-density filters are employed, the perception of flicker is reduced. Indeed, the perception of flicker reduces with increased density of the neutral-density filters.

Moreover, even without neutral-density filters, in a room of average brightness having the shades or blinds drawn, the perception of flicker is entirely under the control of the software designer. If images are carefully created, the perception of flicker may be reduced. Therefore, images must avoid areas of extreme brightness.

It is possible to find a field rate which is somewhere between 60 fields per second and the 120 fields per second which is known to provide a good result. In this way, we can take advantage of most multi-scan monitors and video graphics boards of the VGA and super-VGA type. Such devices are capable of running up to 90 fields per second. For example, IBM developed a high resolution VGA board called the 8514/A, and many other board manufacturers include the 43 Hz interlaced mode of this board in their own products.

Figure 3A:
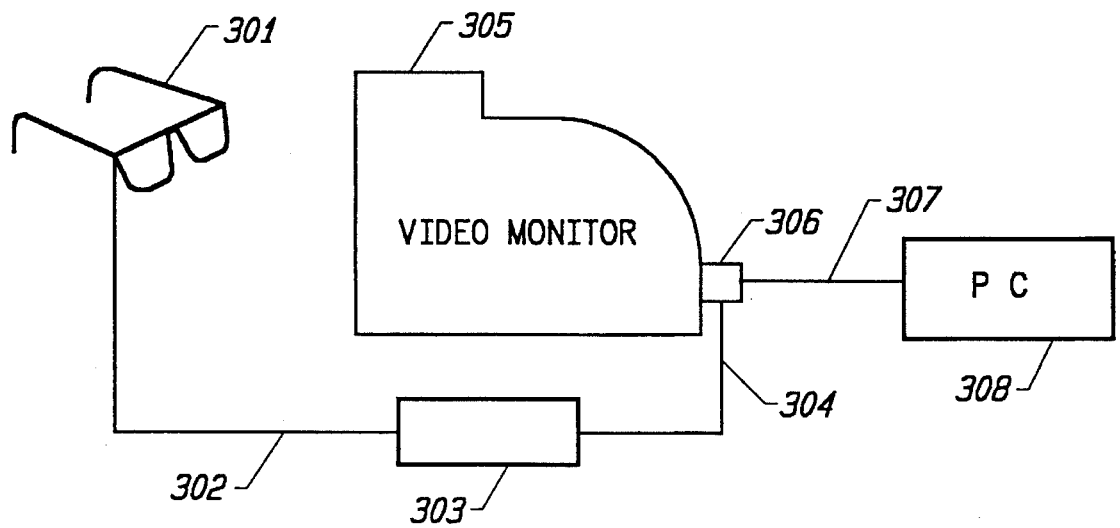
FIG. 3a is a schematic representation of a wired version of the electronic stereoscopic display according to the present invention.
Figure 3C:
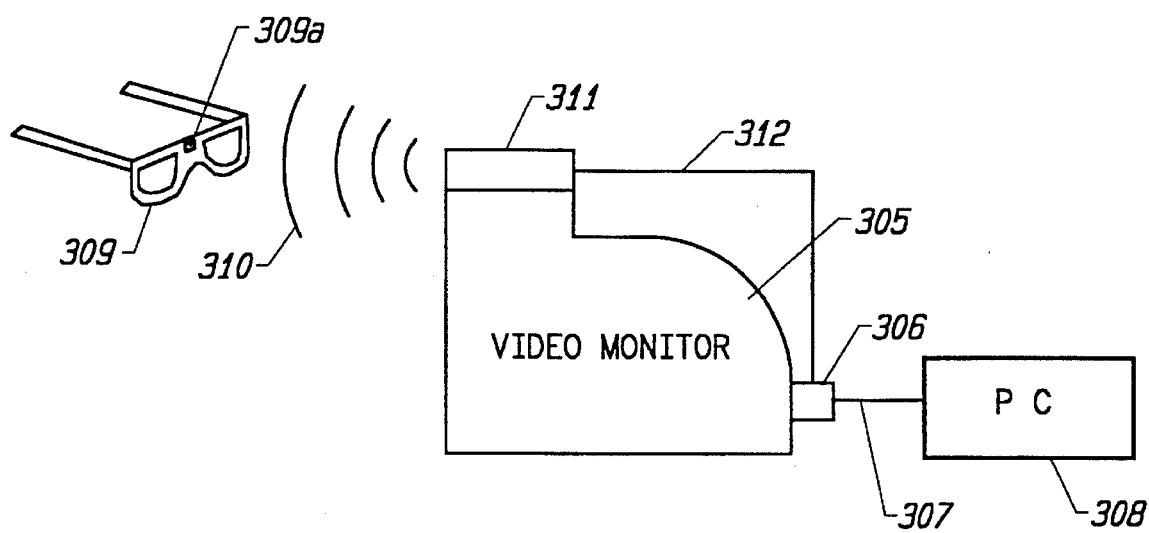
FIG. 3c is a schematic representation of a wireless version of the electronic stereoscopic display having with an electromagnetic communications link between controller and eyewear.

Alternative hardware layouts for the present invention are shown in FIGS. 3a and 3c. The embodiment of FIG. 3a employs wired or tethered eyewear 301, while the embodiment of FIG. 3c uses wireless eyewear 309 having an electromagnetic sensor 309a.

Referring to FIG. 3a, a display monitor 305 is observed through tethered eyewear 301. The eyewear 301 is connected to a controller 303 via cable 302. The controller 303 is connected to an adapter 306 by means of cable 304. The adapter 306 is connected to computer 308 via cable 307 for receiving video and synchronization signals therefrom. The device 308 does not have to be a computer, but it could be any video or computer graphics source, such as a video tape recorder or a workstation. Controller 303 senses the synchronization pulse information which is provided from the computer 308 through adapter 306. Controller 303 then provides, by means of the circuit shown in FIG. 3b (described below), the proper waveform to power eyewear 301 via cable 302.

Although the illustration shows the adapter 306 affixed to the monitor 305 and connected to computer 308 via cable 307, in many cases it will be positioned at computer 308 because monitors often have a permanently attached cable rather than a plug-in type. Adapter 306 is sometimes referred to as a "dongle."

Figure 2A:
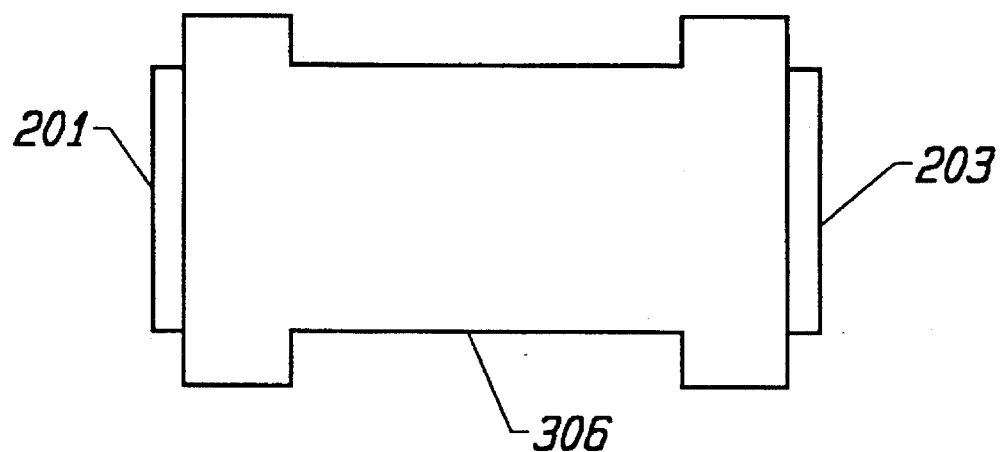
FIG. 2a illustrates the adapter of the present invention.
Figure 4A:
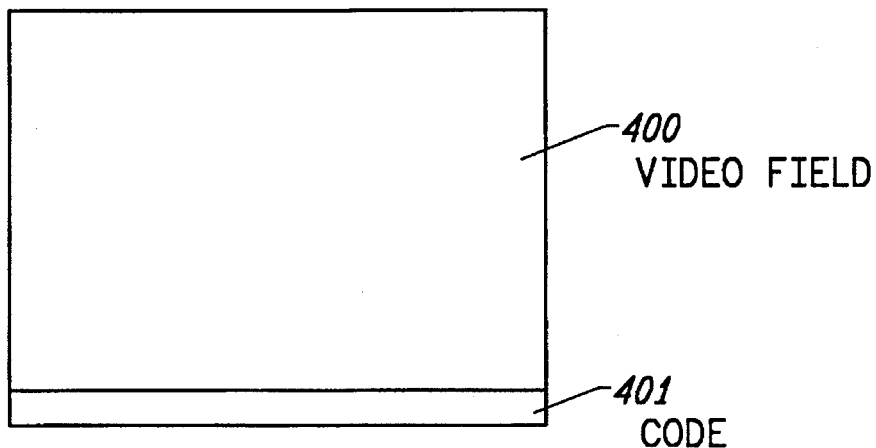
FIG. 4a illustrates a video field having added code for indexing a field with perspective view.

Referring now to FIG. 2a, adapter 306 has connectors 201 and 203, one for plugging the adapter into the monitor 305 and the other for plugging the adapter into cable 307. According to the present invention, it is important that the video fields displayed on monitor 305 be unambiguously tagged or indexed so that each eye sees its appropriate perspective view. This is done by providing a code in the video fields as shown in FIG. 4a and discussed in more detail below. The purpose of adapter 306 is to sense the index code (as well as synchronization pulses) which are provided by the video source or computer 308. This information is then provided to controller 303.

FIG. 4a shows a video field 400 having a plurality of lines in its active area for displaying RGB video signals. According to the present invention, a unique index code 401 is provided on the very last line of the video field, to be followed shortly thereafter by a synchronization or sync pulse (not shown). The index code 401 serves to tag the field 400 with the perspective view of the eye and to warn the electronics that the sync pulse is about to occur. In this case, by arbitrary designation, the perspective will always be the left point of view. The absence of the proper left-tag index code will leave the sync pulse undetected. Therefore, fields of left perspective view are all tagged with the appropriate index code. The proper index code will therefore always be written in the last active line of each left video field.

In such a scheme, it is not necessary to have a standard which says that all left perspective views must be odd fields and all right perspective views must be even fields, or that odd and even fields must be used. Progressive scan may be used. In the prior art, it has been necessary in such a scheme to use an interlace mode where half the fields are used for one perspective and the other half of the fields for the other.

According to the present invention, the provision of such a universal standard will allow progressive as well as interlace scanning modes to be used. It will allow indexing or tagging of either odd or even fields. As long as the software creator furnishes the code specified herein, in the field so specified, on the line specified, then the desired result can be achieved, namely the unambiguous tagging of a field associated with a perspective view. The purpose of the index code or video tag is to cue the controller to use the vertical sync pulse immediately following the video tag to identify the left field.

As noted above, it is preferred that the index code be embedded in the last line of the active video area. With such a scheme, there are three possible conditions that can be communicated by the code.

Figure 4B:
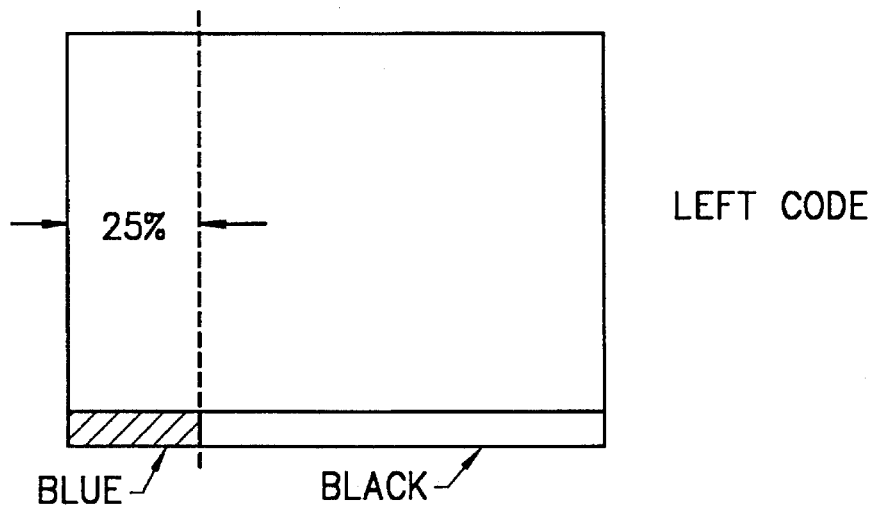
FIG. 4b illustrates a video field having added code for indexing a left field with perspective view.

First, as shown in FIG. 4b, a left code, i.e., one that signifies that the image is the left field of a stereo pair, occurs when the first 25% of the active line contains fully saturated blue video and no red or green video, followed by the remaining 75% of the active line being completely black, i.e., fully unsaturated red, green, and blue.

Figure 4C:
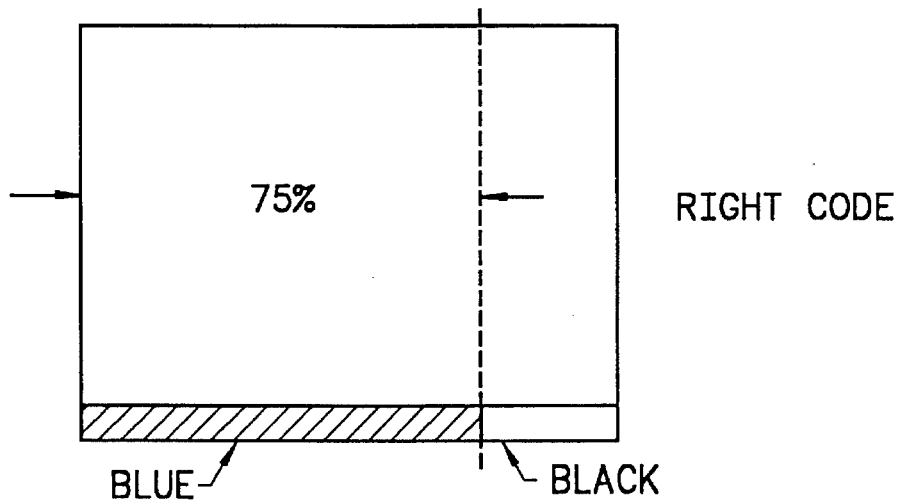
FIG. 4c illustrates a video field having added code for indexing a right field with perspective view.
Figure 5:
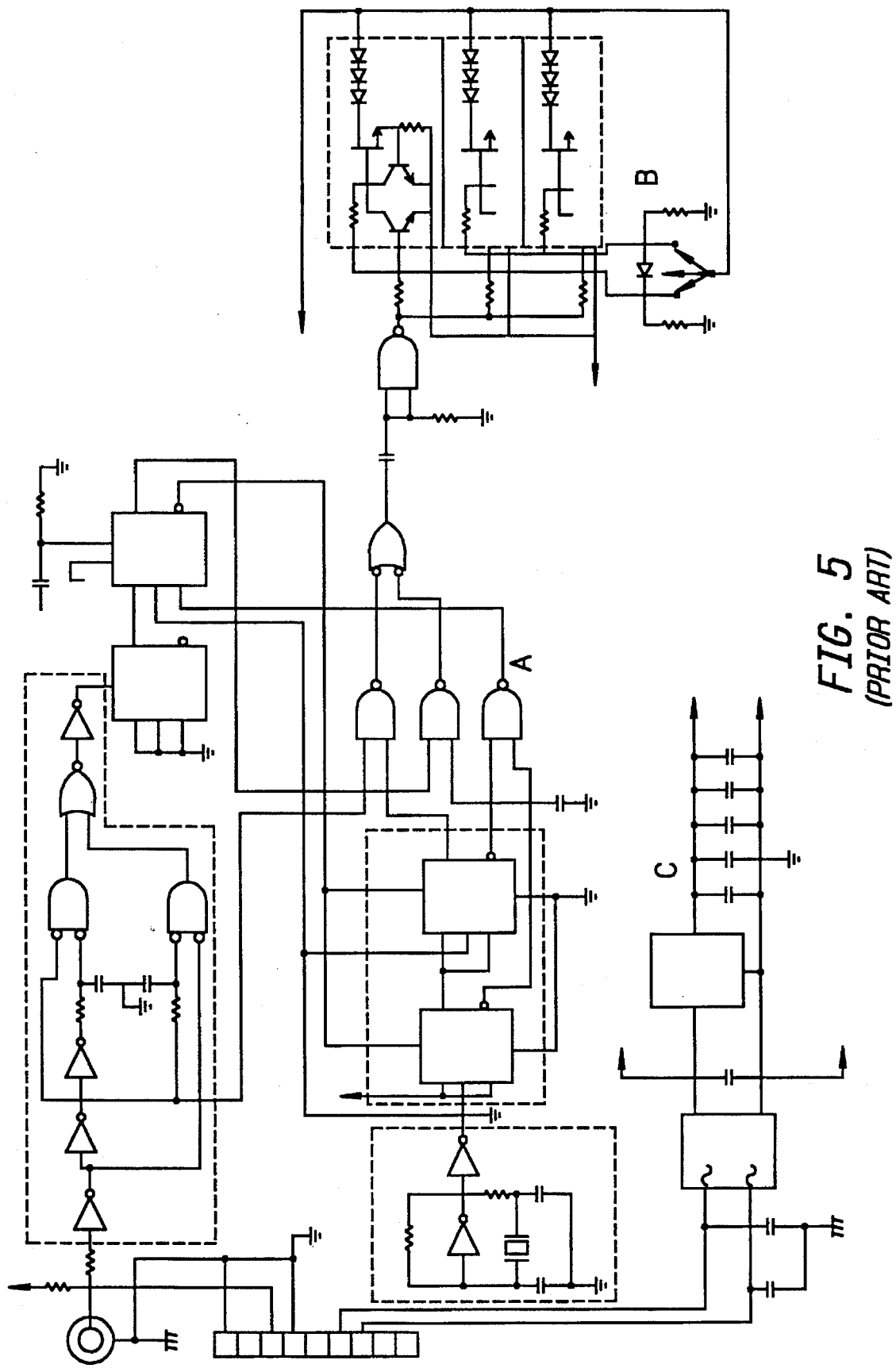
FIG. 5 is a block diagram of a prior art infrared transmitting circuit.

Second, as shown in FIG. 4c, a right code, i.e., one that signifies that the image is the right field of a stereo pair, occurs when the first 75% of the active line contains fully saturated blue video and no red or green video, followed by the remaining 25% of the active line completely black.

Third, a code could be provided which indicates both low speed scan rates as well as the above-and-below format. For example, a code that signifies that the image is the right field of a stereo pair that is being displayed in the above-and-below format occurs when the first 50% of the active line contains fully saturated blue video (and no red or green video) followed by the remaining 50% of the active line completely black.

These codes are designed to prevent misinterpretation and any resulting erroneous action, and it should be obvious that variations in the coding could be provided. In the preferred embodiment, and in order to ensure accurate operation, a strict sequence of events must occur before a code is acted upon. First, the code itself must be detected, including the requirement that there be no video content of either green or red on the same line as the code. Blue was chosen as the single component least likely to be present alone at high values. Second, no other video can be present on any subsequent lines to the code line. If additional non-black video is after the code is sensed, the code is false and is ignored. Third, the code must be followed by a vertical sync pulse within a few lines. We have selected 32 lines as a convenient limit. Fourth, valid codes must alternate left-right-left-right, etc. If a sequence occurs where more than one of the same code is detected, all codes are ignored until the repeating pattern is once again restored.

Figure 2B:
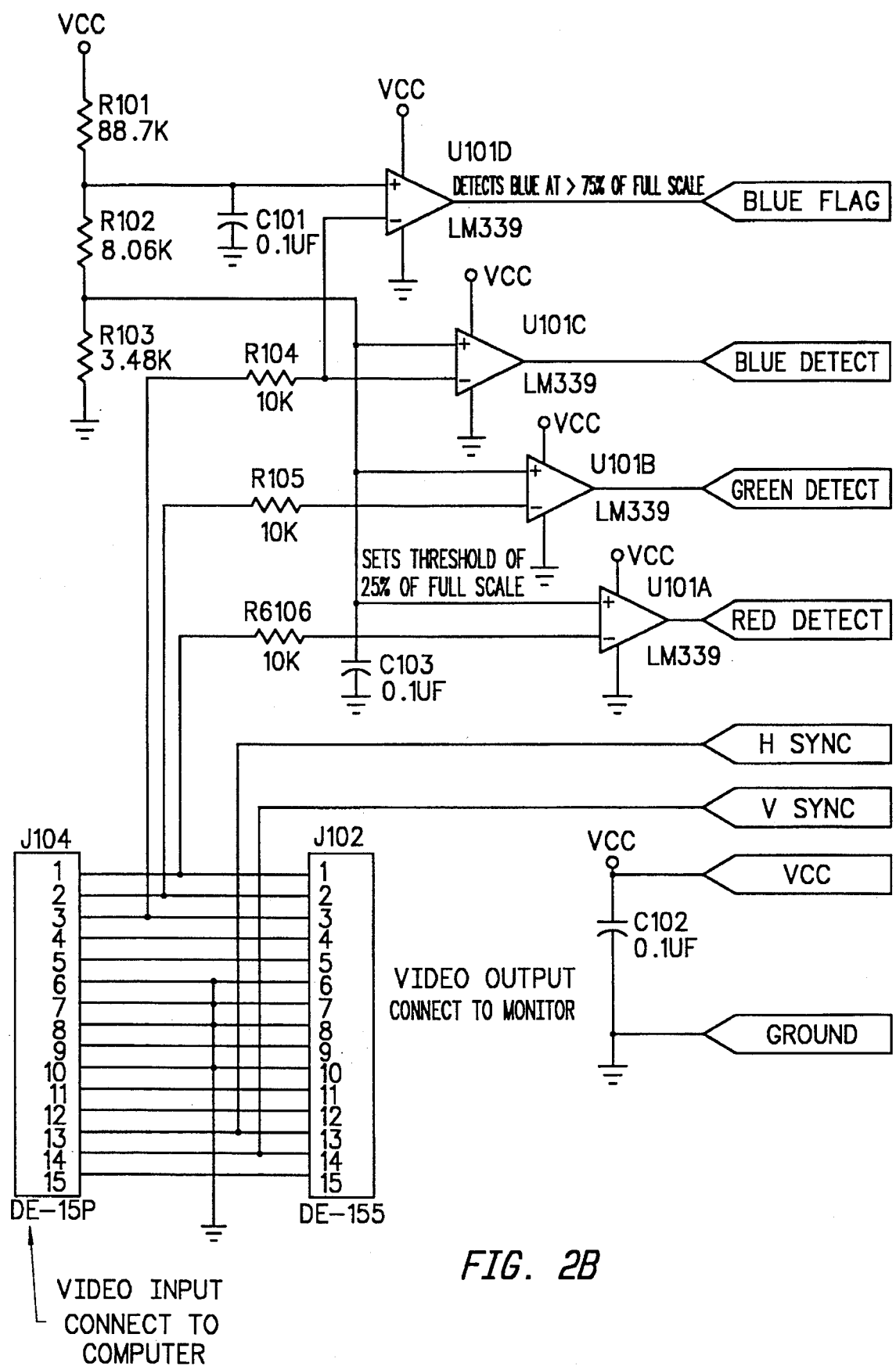

Referring now to FIG. 2b, video signals from the computer 308 are passed to the monitor 305 through adapter 306. Video in the form of analog red, green, and blue video, plus digital horizontal and vertical sync are input from the computer 308 at connector J101 and passed through to the monitor 305 at connector J102. As these signals pass through the adapter 306 they are monitored by the circuitry inside. Horizontal and Vertical sync signals are passed directly to Controller 303 via cable 304.

The analog video generated by the computer 308 has a peak value of 0.7 volts on any of the red, green, or blue signals. With a power supply voltage Vcc=5 Volts, resistors R101, R102, and R103 form a voltage divider network to establish thresholds at 173 millivolts and 576 millivolts. These values correspond to 25% and 75% of full scale.

Comparator U101d compares the amplitude of the blue video signal on pin 3 with the 75% threshold. A signal called BLUE FLAG goes low whenever the blue video signal exceeds this threshold. This will occur whenever there is a video signal in the field.

Comparators U101a, U101b, and U101c compare the blue video signal amplitude with the 25% threshold. Signals called RED DETECT, GREEN DETECT, or BLUE DETECT go low whenever the respective analog video signal exceeds this threshold. This will occur on the last line of each field for one quarter or three 25% or 75% of the line, as shown in FIGS. 4b and 4c.

The purpose of these four comparators is to determine the current state of the video signals. None are active when the image is black, the BLUE DETECT and BLUE FLAG are active when the image is the blue-only part of the code, and any one or more of RED DETECT, GREEN DETECT, or BLUE DETECT are active when there is any real image visible.

Figures 1, 3B:
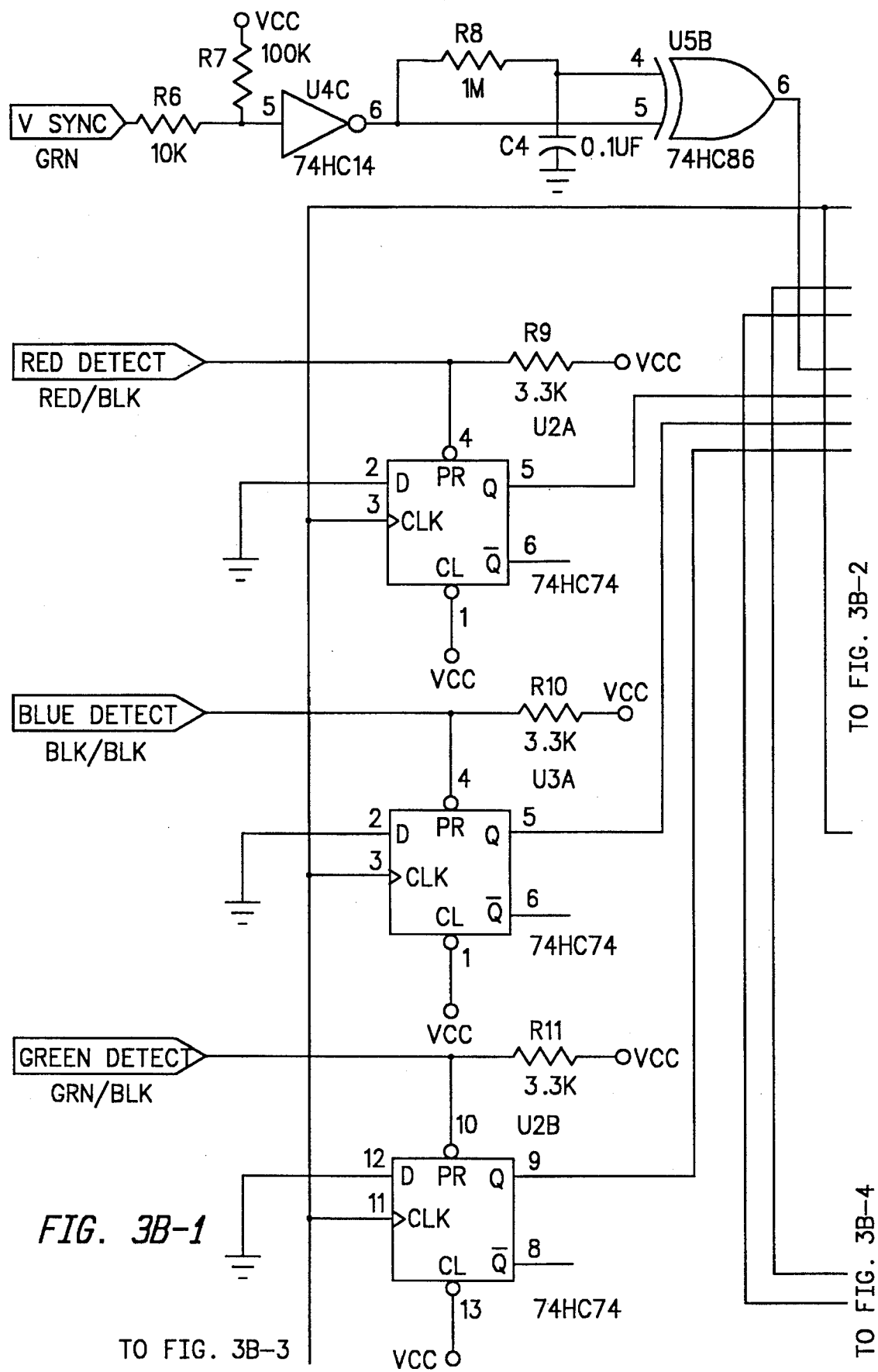
Figures 2, 3B:
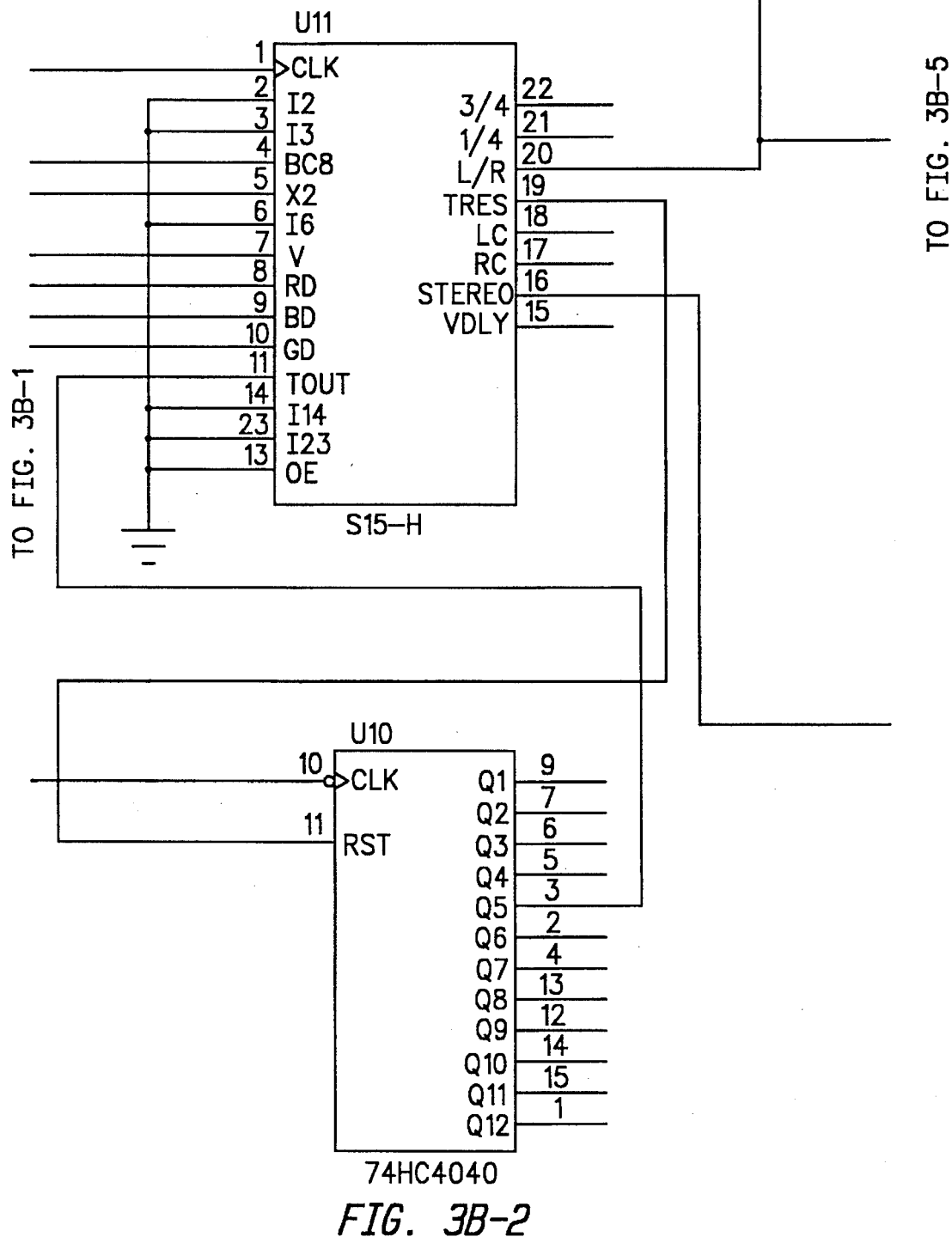
Figures 3, 3B:
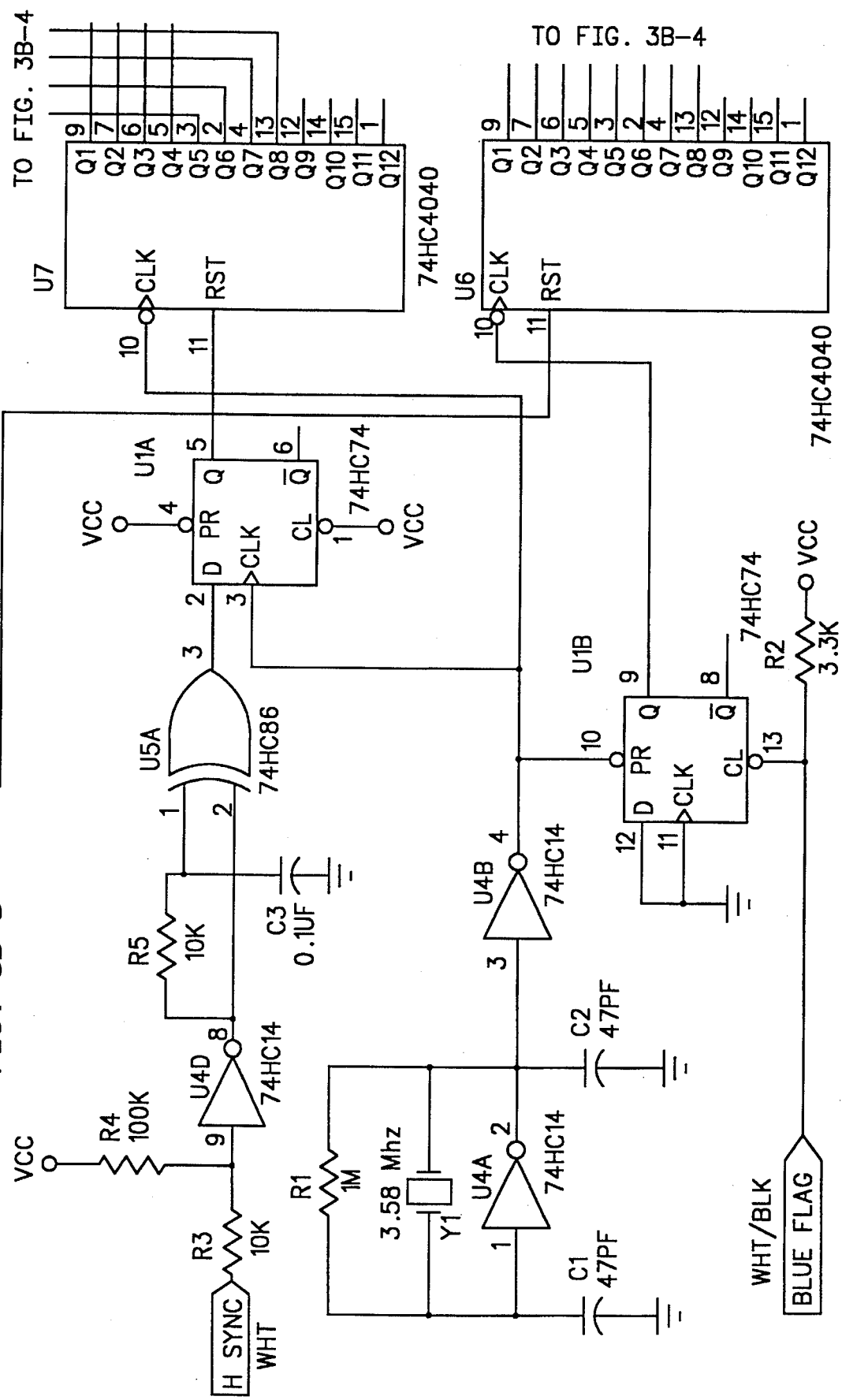
Figures 3, 3B, 4:
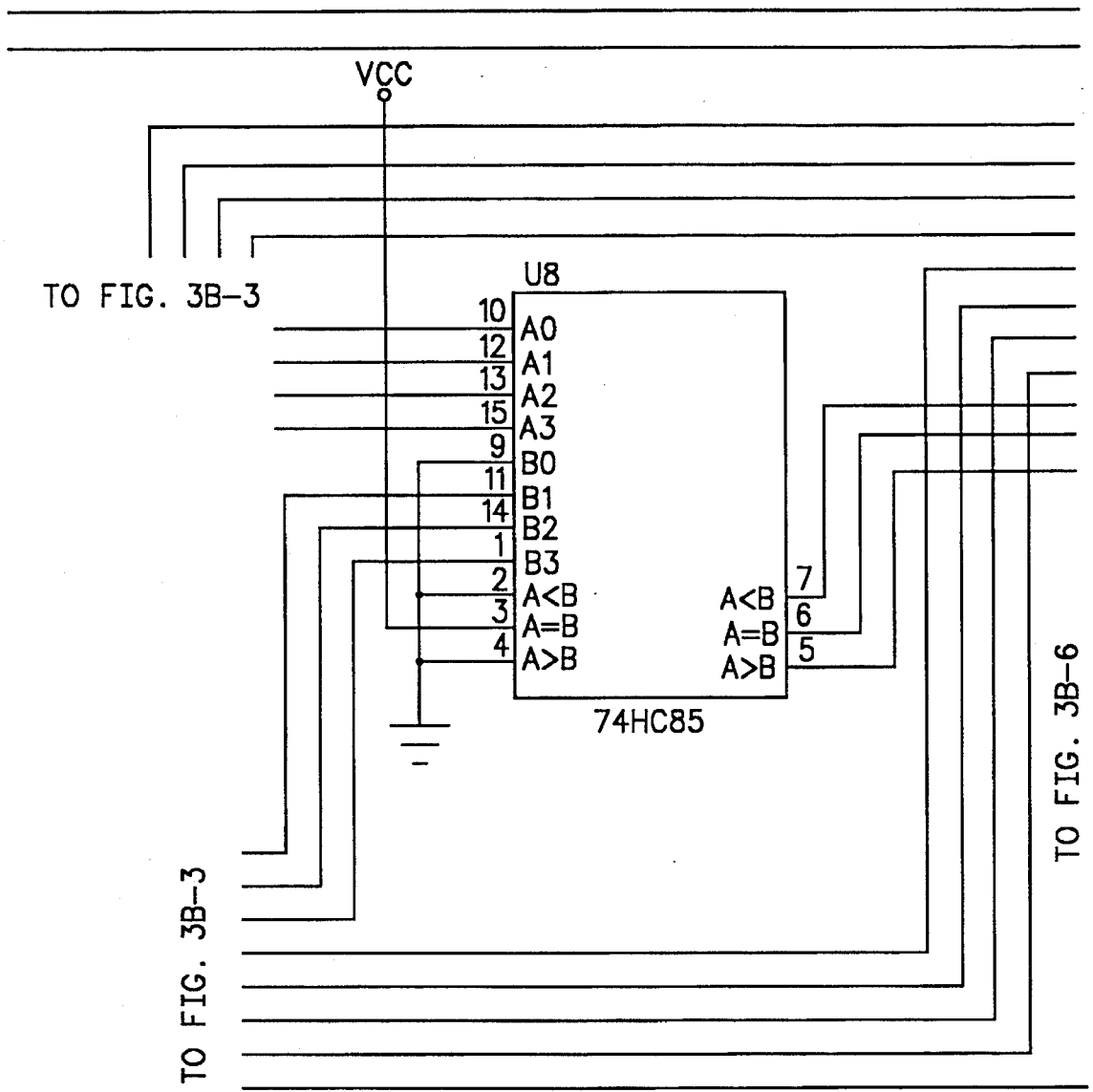

The circuit for controller 303 is shown in FIG. 3b. Inverters U4a and U4b, resistor R1, crystal Y1, and capacitors C1 and C2 form a crystal oscillator. In this application, 3.58 Mhz was chosen because of the low cost and high availability of the crystal, but virtually any frequency between 1 and 10 Mhz could have been chosen. The output of inverter U4b is the CLK signal used widely through the circuit.

Inverter U4d, resistors R3, R4, and R5, capacitor C3, and XOR gate U5a process the horizontal sync input. Resistor R5 and capacitor C3 form a filter whose output is high if the horizontal sync pulse is active low, and low if the horizontal sync pulse is active high. This is then used by the XOR gate U5a, whose output is an active high pulse regardless of the polarity of the input.

Inverter U4c, resistors R6, R7, and R8, capacitor C4, and XOR gate U5b perform the identical process on the vertical sync input, again guaranteeing an active high pulse regardless of input polarity.

Flip-flop U1a a is used to synchronize the horizontal sync input to the internally generated clock. (All subsequent references to horizontal sync will be this input and will be referred to as HSYNC).

Counter U7 is used to measure the length of the horizontal line of video. During HSYNC the counter is reset. When the line begins (HSYNC returns low) the counter U7 begins to count clock pulses CLK.

Counter U6 is used to measure the length of the blue flag. The blue flag input is terminated by resistor R2 and flip-flop U1b serves as a controlled gate. Whenever the blue flag is present, the output of flip-flop U1b will be an inverted version of CLK. When the blue flag is not present, the output of flip-flop U1b will go high and remain high. This signal is used as the clock to the counter U6. The counter is reset to zero during HSYNC. When (and if) the blue flag signal is activated, the counter will begin to count. When the blue flag ends, the counting stops and the counter holds its last value.

Four-bit magnitude comparators U8 and U9 are cascaded together to form an eight bit magnitude comparator. The A inputs are the horizontal line counter. The B inputs are the blue flag counter multiplied by two (by shifting the inputs one bit position).

Flip-flops U2a, U2b, U3a, and resistors R9, R10, and R11 are used to latch any instance of detected red, blue, or green video. Each latch is set if that video component is detected, and cleared at the beginning of HSYNC.

A Generic Array Logic (GAL) U11, in this case a GAL20V8, is used to collect the various inputs and latch valid codes. The evaluation takes place at the end of each line, on the rising edge of HSYNC.

The logic equations used to define the GAL outputs are given in Table 1:

than two times the length of the blue flag (counted by U6); or (2) blue has been detected; no green has been detected; no red has been detected; and the most significant of the 8 valid bits measuring the blue flag is set.

The vertical sync signal V is latched as VDLY. This will be necessary to determine when the first line of the vertical interval occurs, i.e., when V is high but VDLY is low.

A counter U10 is controlled by an output called TIMRESET. This output is activated, resetting the counter to zero, when either a one-quarter or three-quarter feedback is active, or when neither is active but red, green, or blue video is detected.

A latch RC indicates that a right code has been detected. This latch, once set by the three-quarter feedback, remains set unless one of several disqualifying conditions occurs: it stays set if neither red, green, nor blue video is detected, and if less than 32 lines have passed since the initial detection of the code (the Q5 output of counter U10), and until the second line of the vertical interval (when VDLY activates). A similar latch LC indicates that a left code has been detected, identical to RC except activated by the one-quarter feedback.

Once left and right code latches have been established, a left/right status signal can be created. Left status should be set at the beginning of the vertical interval following the detection of a right code and should stay set until the first line of the next field. Four product terms are used to establish the left/right signal: the RC latch at the first line of the vertical interval, or the three-quarter feedback at the first line of the vertical interval (in cases when the vertical interval

TABLE I

```
CHIP S151 GAL20V8
CLK BC6 BC7 BC8 X2 X8 V RD BD GD TIMEOUT GND
/OE 114 VDLY STEREO RC LC TIMRESET LR THREEQTR ONEQTR 123 VCC
@UES 0000000000000000
EQUATIONS
VDLY := V
THREEQTR = BD*/GD*/RD*/X2 + BD*/RD*/GD*BC8
ONEQTR = BD*/GD*/RD*X2*/BC8
RC := THREEQTR + RC*/TIMEOUT*/VDLY*/RD*/GD*/BD
LC := ONEQTR + LC*/TIMEOUT*/VDLY*/RD*/GD*/BD
TIMRESET    := /ONEQTR*/THREEQTR*BD
            + /ONEQTR*/THREEQTR*RD
            + /ONEQTR*/THREEQTR*GD
            + ONEQTR + THREEQTR
STEREO := V*/VDLY*LC*LR + V*/VDLY*ONEQTR*LR
       + V*/VDLY*RC*LR + V*/VDLY*THREEQTR*LR
       + STEREO*/V + STEREO*VDLY
LR := V*/VDLY*RC + V*/VDLY*THREEQTR + LR*/V + LR*VDLY
```

Non-registered feedbacks are defined for both one quarter and three quarter blue flag conditions. The one quarter line feedback is activated when all of the following conditions are true: blue has been detected; no green has been detected; no red has been detected; the length of the horizontal line (counted by U7) is more than two times the length of the blue flag (counted by U6); and the most significant of the 8 valid bits measuring the blue flag is not set.

The last condition is required so that the results of the comparison are valid. Since the length of the blue flag is multiplied by two before comparison, this multiplication (accomplished by shifting the 8 bit result) creates an excess bit that would not be part of the comparison.

The three-quarter line feedback is activated when all of the following conditions are true: (1) blue has been detected; no green has been detected; no red has been detected; and the length of the horizontal line (counted by U7) is not more begins coincident with the end of the last line of the field), or the left/right status is already set and it is not the vertical interval (i.e. it is the visible part of the subsequent field), or the left/right status is already set and it is still the vertical interval A stereo enable is created in the same way as the left/right status signal, except that it is activated by either the one-quarter or three-quarter feedbacks, or either the LC or RC code latches. The stereo enable is terminated in the same way at the first line of the next field. In addition, the sequence of left and right codes must alternate.

Flip-flop U3b uses the left/right status as a clock and toggles its output on each rising transition. The combination of the output of flip-flop U3b and the left/right status form a two bit count of the four states required to properly drive the liquid crystal shutters. As the sequence progresses, analog switches U13 and U12 gate the proper voltages to each end of the shutters as shown in Table II:

TABLE II

| State Code | Function | Left Shutter X | Left Shutter Y | Left Shutter Voltage | Right Shutter X | Right Shutter Y | Right Shutter Voltage |
| --- | --- | --- | --- | --- | --- | --- | --- |
| 00 | Right Visible | +9 | −9 | +18 | 0 | 0 | 0 |
| 01 | Left Visible | 0 | 0 | 0 | +9 | −9 | +18 |
| 10 | Right Visible | −9 | +9 | −18 | 0 | 0 | 0 |
| 11 | Left Visible | 0 | 0 | 0 | −9 | +9 | −18 |

The net result of the switching is a 36 Volt p-p waveform as described in the prior art. The STEREO output of U11 is used to enable the drivers U12 and U13 via the INHIBIT input of each.

Referring to FIG. 3c, controller 311 hooks up to the adapter 306 by means of cable 312, and then broadcasts an infrared scheme of the type which is described in U.S. Pat. No. 4,967,268. An infrared scheme is only one of many types of electromagnetic radiation that may be used, but it has been found to be a practical and low-cost solution to the problem. Eyewear 309 is of the type described in the various patents covering the CrystalEyes® eyewear as given above. A sensor 309a in eyewear 309 receives the electromagnetic signal 310 for communication between controller 311 and the eyewear 309, and then synchronizes the shutters of the eyewear with the appropriate perspective view so that the shutters open and close in proper sequence and each eye sees its appropriate perspective view, as described above.

Figures 3, 3B, 4, 5:
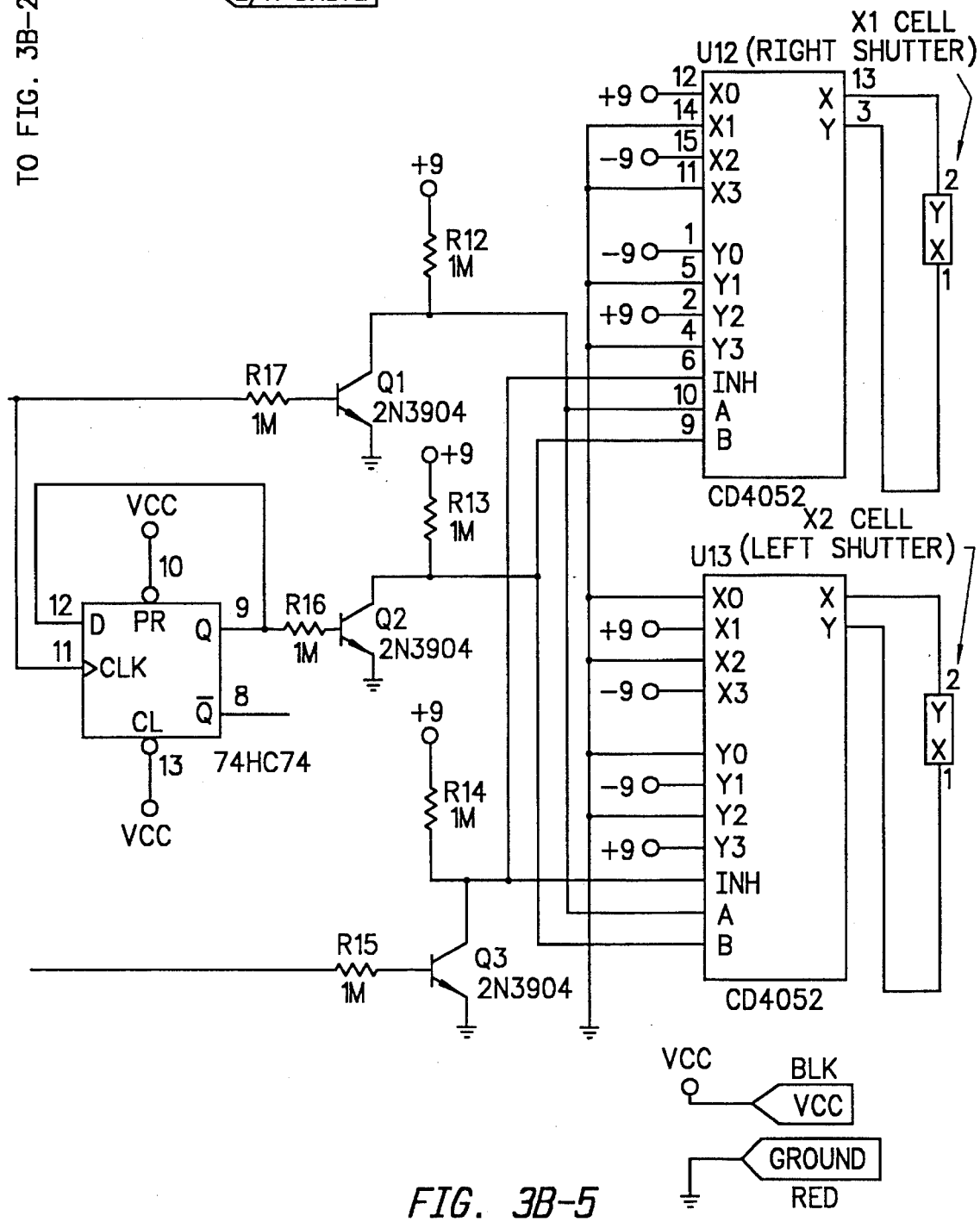
Figures 1, 3D:
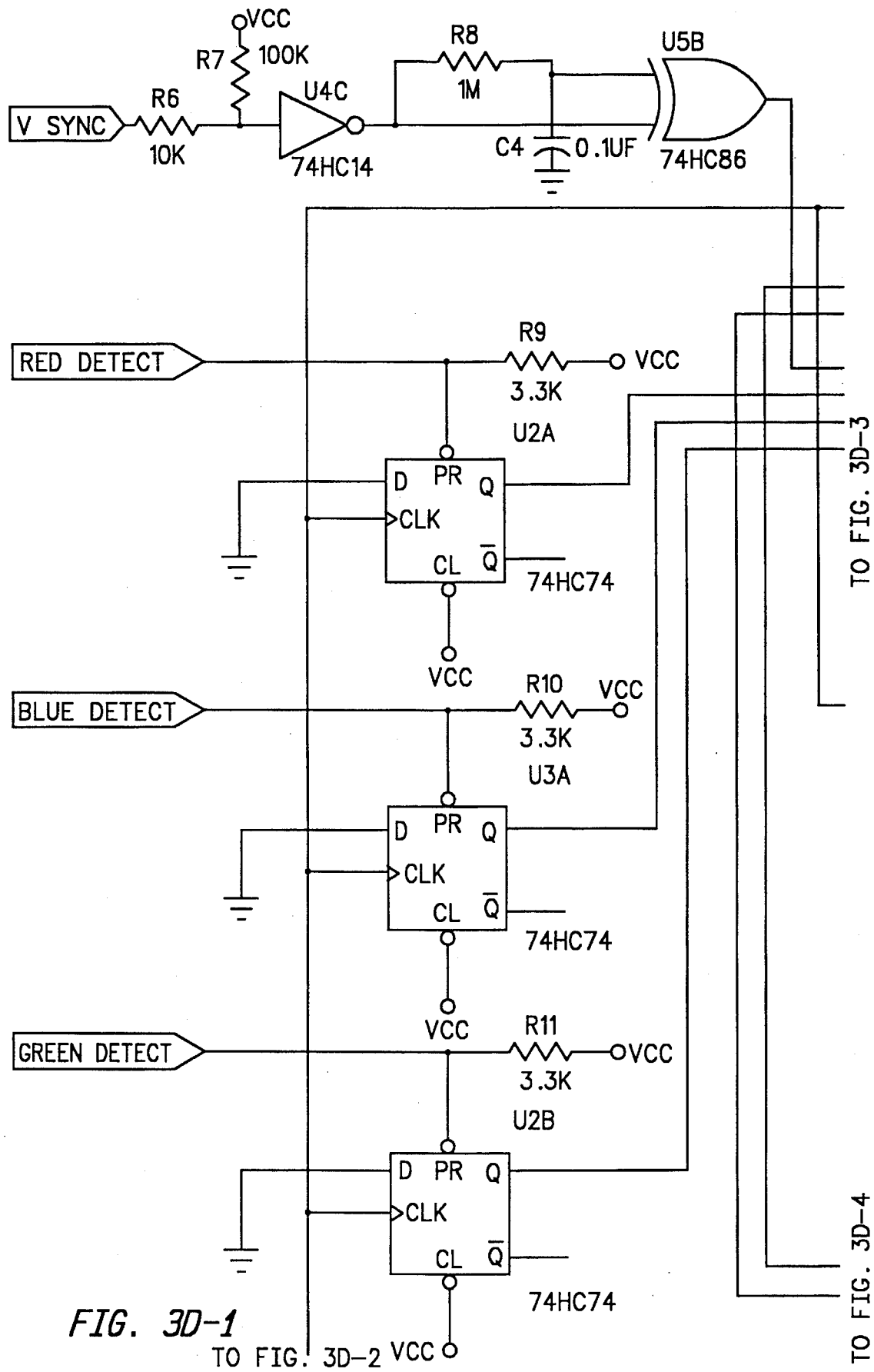
FIG. 3d is a circuit diagram of the controller shown in FIG. 3c.
Figure 3D:
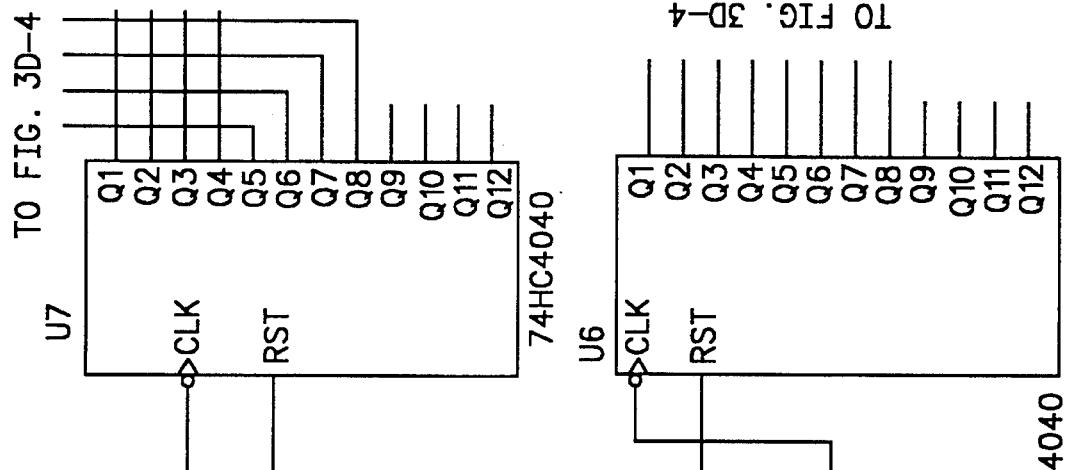
Figure 2:
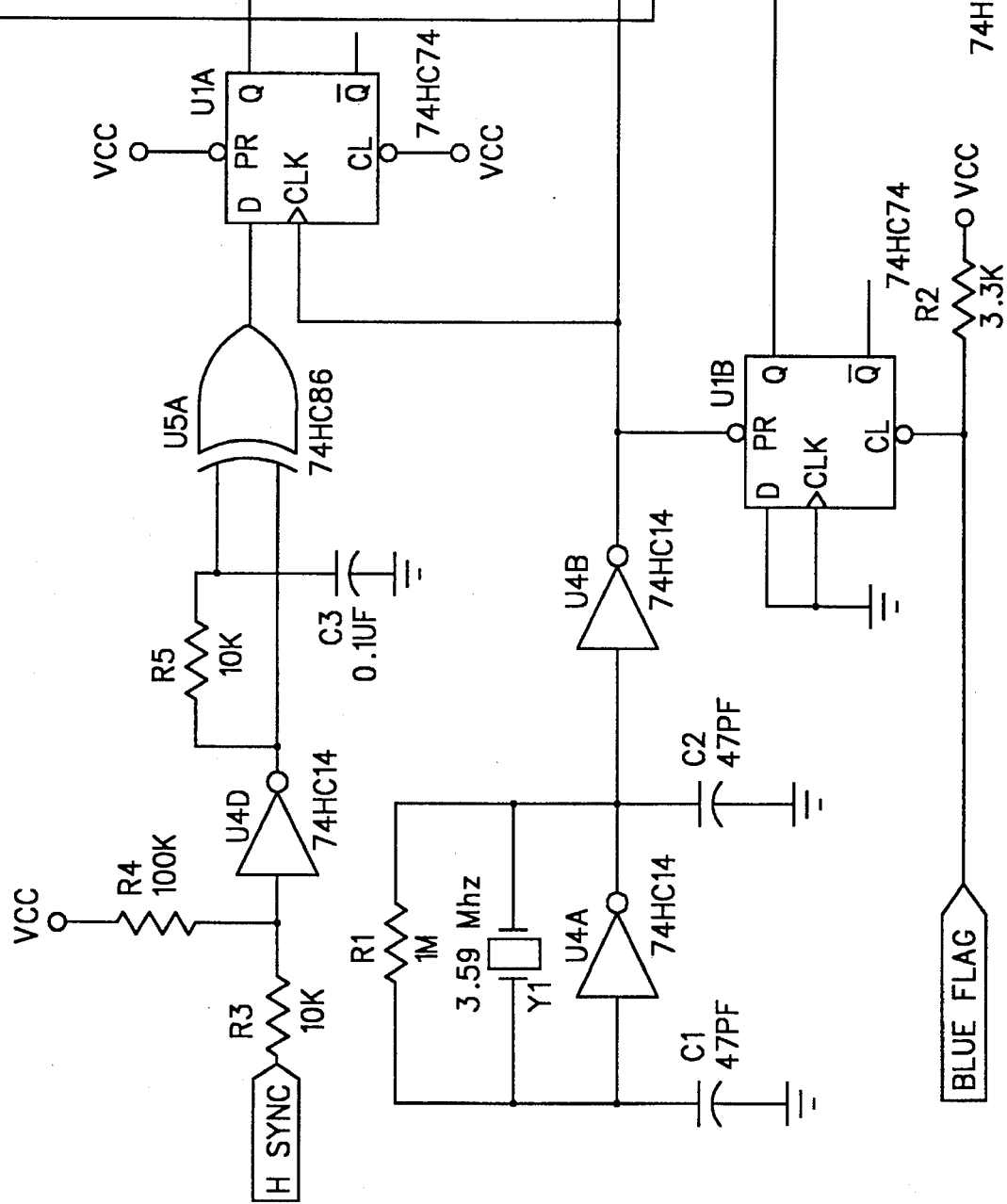
Figures 3, 3D:
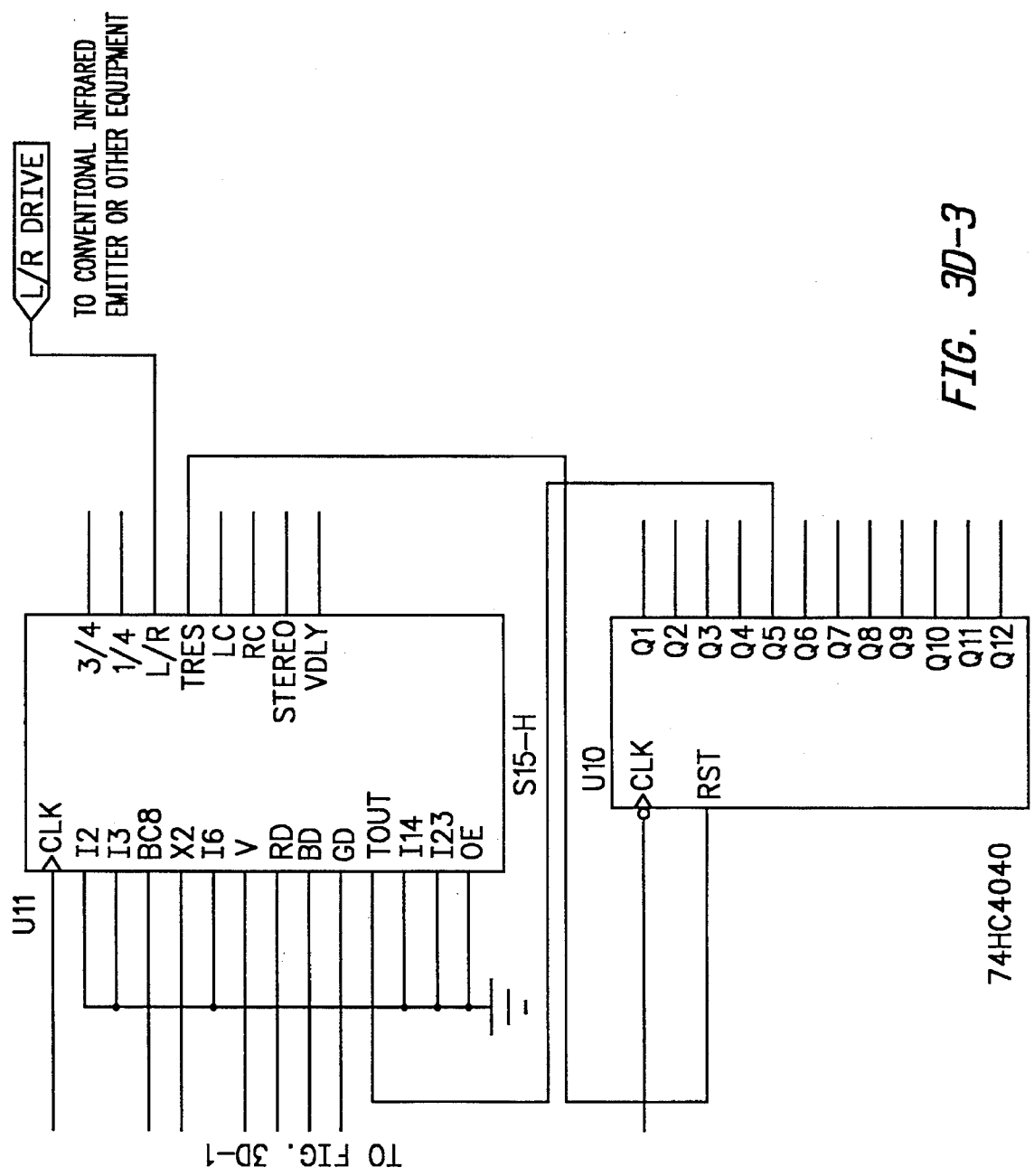
Figures 3, 3D, 4:
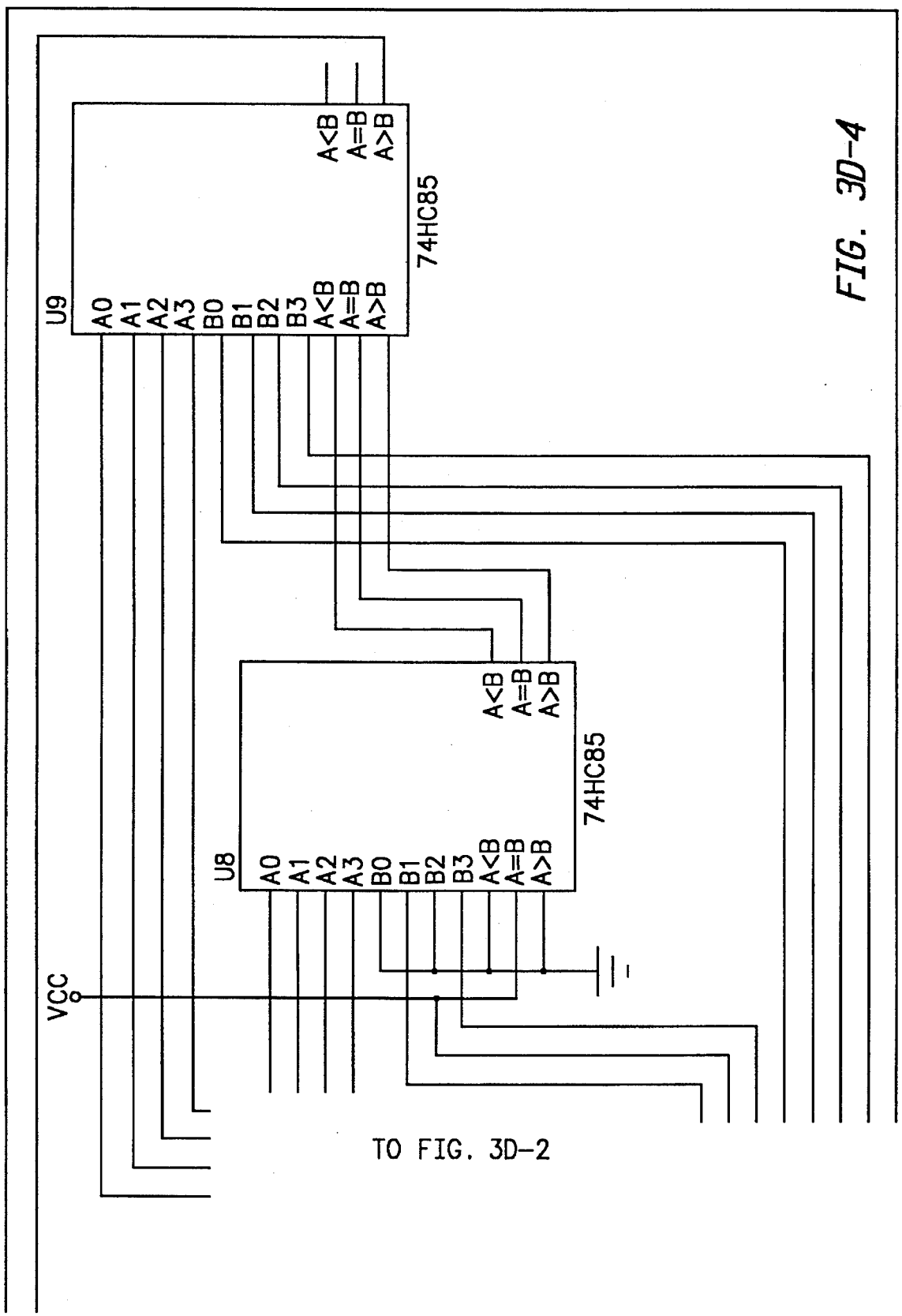

The circuit for controller 311 in given in FIG. 3d, and it is the same as that given in FIG. 3b up to the point where the left/right status signal is created in GAL U11. This left/right status signal is passed directly to the infrared emitter circuit of FIG. 5.

It is also possible to add the software index marks described herein to the above-and-below format. In that case, the controllers 303 and 311 would need to supply the added subfield blanking sync pulse. There might be some advantage to using the above-and-below format at 45 fields per second to provide the 90 fields per eye per second format. Software designers have become accustomed to this format.

By the means described here we have provided a universal electronic stereoscopic display technology which can provide flicker-reduced images, independent of interlace or progressive scan considerations, which can be unambiguously tagged to avoid the pseudoscopic condition. This is a low-cost means for providing electronic stereoscopic displays using off-the-shelf monitors and off-the-shelf computers and graphics boards.

It should be understood that the invention is not intended to be limited by the specifics of the above-described embodiments, but rather defined by the accompanying claims.

We claim:

1. A method for identifying the perspective view for a video field in a stereoscopic video signal, comprising the steps of:

encoding the video field with a predetermined video code, monitoring the video signal using a circuit adapted to detect the video code, and enabling a field selection device when the video code is detected by the circuit.

2. A method as in claim 1, wherein the encoding step comprises filling a first portion of a line in the video field with a saturated video signal and filling a second portion of the line with an unsaturated video signal.

3. A method as in claim 1, wherein the video field has a plurality of lines which define an active area thereof and wherein the encoding step comprises embedding the video code in a predetermined location of the active area of the video field.

4. A method as in claim 3, wherein the predetermined location is a last line of the active area of the video field.

5. A method as in claim 1, wherein the encoding step comprises encoding a left video field with a first video code and encoding a right video field with a second video code.

6. A method as in claim 5, wherein the encoding step comprises filling a first portion of a line in the left video field with a saturated video signal, filling a second portion of the line in the left video field with an unsaturated video signal, filling a first portion of a line in the right video field with a saturated video signal, filling a second portion of the line in the right video field with an unsaturated video signal, wherein the first and second portions of the line in the left video field have a different ratio than the first and second portions of the line in the right video field.

7. The method of claim 5, wherein the field selection device includes a left shutter and a right shutter, and wherein the enabling step comprises enabling the left shutter when the first video code is detected by the circuit and enabling the right shutter when the second video code is detected by the circuit.

8. The method of claim 7, wherein the enabling step further comprises enabling the left shutter when the circuit detects no additional video content following the first video code, and enabling the right shutter when the circuit detects no additional video content following the second video code.

9. The method of claim 8, wherein the enabling step further comprises enabling the left and right shutters only if an alternating pattern of first and second video codes is detected.

10. A method for identifying a left video field and a right video field in a stereoscopic composite video signal, comprising the steps of embedding a first predetermined video code in the left video field and embedding a second predetermined video code in the right video field.

11. A method as in claim 10, further comprising the steps of monitoring the video signal, generating a left shutter enable signal upon detection of the first predetermined video code and generating a right shutter enable signal upon detection of the second predetermined video code.

12. An electronic stereoscopic display system, comprising:

video source means for generating a video signal, said video signal including left and right video fields each having a plurality of lines therein, wherein at least one of the video fields is encoded with a first video code on a predetermined line of the video field;

display means for receiving and displaying the video signal;

eyewear for viewing the display means;

interface means for coupling the video source means to the display means, said interface means being adapted to monitor the video signals, to detect the first video code, and to generate a shutter enable flag upon detection of the first video code; and controller means coupled to the interface means for generating and transmitting a shutter enable signal to the eyewear after receiving the shutter enable flag;

wherein said eyewear includes left and right electrooptical shutters therein responsive to the controller means.

13. A system as in claim 12, wherein the video code comprises a saturated video signal filling a first portion of the predetermined line and an unsaturated video signal filling a second portion of the predetermined line.

14. A system as in claim 12, wherein the predetermined line is a last line of an active video area.

15. A system as in claim 12, wherein the left video field is encoded with the first video code and the right video field is encoded with a second video code.

16. A system as in claim 15, wherein the first video code comprises a saturated video signal filling a first portion of the predetermined line of the left video field and an unsaturated video signal filling a second portion of the predetermined line of the left video field, and wherein the second video code comprises a saturated video signal filling a first portion of the predetermined line of the right video field and an unsaturated video signal filling a second portion of the predetermined line of the right video field, wherein the first and second portions of the predetermined line in the left video field have a different ratio than the first and second portions of the predetermined line in the right video field.

17. An adapter for coupling a stereoscopic video source to a video display unit, wherein the video source transmits composite video signals to the display in the form of left video fields and right video fields, each video field having a plurality of lines, at least one of said video fields having a first video code embedded on a predetermined line therein, said adapter comprising circuit means for monitoring the video signals and for generating a perspective identification signal upon detection of the first video code on the predetermined line.

18. An adapter as in claim 17, wherein the left video fields have the first video code embedded on the predetermined line therein and the right video fields have a second video code embedded on the predetermined line therein, and wherein said circuit means generates a left perspective identification signal upon detection of the first video code on the predetermined line of the left video field and a right perspective identification signal upon detection of the second video code on the predetermined line of the right video field.

19. A method for electronically identifying the perspective of left and right images in a stereoscopic video signal, wherein the video signal is reproduced on a video display screen and a user observes the video display screen through a field selection device having left and right electrooptical shutters therein, comprising:

encoding a specific location of each image with a video code, wherein the left images are encoded with a first video code and the right images are encoded with a second video code, monitoring the video signal using circuit means adapted to detect at least the first and second video codes, and enabling the left electrooptical shutter when the first video code is detected and enabling the right electrooptical shutter when the second video code is detected.

20. The method of claim 19, wherein the enabling step further comprises enabling one of said shutters only if the first video code and the second video code are alternately detected by the circuit means.

21. The method of claim 19, wherein the encoding step further comprises encoding each image with the video code on a last active line, and wherein the enabling step further comprises enabling a shutter only if no additional video is detected for each image after the video code and the first video code and the second video code are alternately detected.

* * * * *